(12) United States Patent
Oh et al.

(10) Patent No.: US 11,194,370 B2
(45) Date of Patent: Dec. 7, 2021

(54) WAVEGUIDE CONNECTOR AND DISPLAY APPARATUS INCLUDING THE SAME

(71) Applicant: SAMSUNG ELECTRONICS CO., LTD., Suwon-si (KR)

(72) Inventors: Sang-Gi Oh, Yongin-si (KR); Sang Hyuk Wi, Yongin-si (KR); Chang Geun Yu, Bucheon-si (KR); Sang Ho Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/635,761

(22) PCT Filed: May 9, 2018

(86) PCT No.: PCT/KR2018/005309
§ 371 (c)(1),
(2) Date: Jan. 31, 2020

(87) PCT Pub. No.: WO2019/027125
PCT Pub. Date: Feb. 7, 2019

(65) Prior Publication Data
US 2021/0124402 A1    Apr. 29, 2021

(30) Foreign Application Priority Data
Aug. 4, 2017  (KR) .......................... 10-2017-0098857

(51) Int. Cl.
*G06F 1/16*    (2006.01)
*G02B 6/28*    (2006.01)

(52) U.S. Cl.
CPC ......... *G06F 1/1698* (2013.01); *G02B 6/2804* (2013.01)

(58) Field of Classification Search
CPC .......... G06F 1/1698; G02B 6/10; G02B 6/28; G02B 6/2804
See application file for complete search history.

(56) References Cited

U.S. PATENT DOCUMENTS 3,758,880 A * 9/1973 Morz ........................ H01P 1/16
333/122
4,863,232 A * 9/1989 Kwa ........................ G02B 6/32
385/89
(Continued)

FOREIGN PATENT DOCUMENTS

JP    2005-39414    2/2005
JP    2012-90044    5/2012
(Continued)

OTHER PUBLICATIONS

International Search Report for PCT/KR2018/005309 dated Sep. 11, 2018, 5 pages.
(Continued)

*Primary Examiner* — Adrian S Wilson
(74) *Attorney, Agent, or Firm* — Nixon & Vanderhye, P.C.

(57) ABSTRACT

A waveguide connector and a display apparatus including the same having a partition wall provided therein so that each of electromagnetic signals of different phases generated from a circuit board independently forms a waveform are provided.
In accordance with an aspect of the present embodiment, a waveguide connector includes a main body including an inner space through which an electromagnetic signal travels; a first opening provided on one surface of the main body so that electromagnetic signals of different phases generated from an antenna provided on a circuit board enter the inner space; a second opening provided on the other surface of the main body so that the electromagnetic signals of the different
(Continued)

phases traveling through the inner space enter a waveguide; and a partition wall provided in the inner space of the main body so that each of the electromagnetic signals having the different phases independently forms a waveform.

14 Claims, 13 Drawing Sheets

(56) References Cited

U.S. PATENT DOCUMENTS

| | | | | |
|---|---|---|---|---|
| 5,971,566 A * | 10/1999 | Tani | ............... | H05K 7/20972 313/46 |
| 6,490,395 B1 * | 12/2002 | Nara | ............... | G02B 6/12014 385/15 |
| 6,606,073 B1 * | 8/2003 | Visser | ............... | H01Q 21/0087 343/771 |
| 8,243,424 B1 * | 8/2012 | Babu | ............... | G06F 3/045 361/679.01 |
| 9,166,290 B2 | 10/2015 | Blech | | |
| 10,383,227 B2 * | 8/2019 | Oh | ............... | G02F 1/133308 |
| 2004/0264867 A1 * | 12/2004 | Kondo | ............... | H01L 24/24 385/49 |
| 2006/0234787 A1 * | 10/2006 | Lee | ............... | H05K 7/1412 455/575.7 |
| 2009/0290832 A1 * | 11/2009 | Kim | ............... | G02B 6/132 385/14 |
| 2012/0092093 A1 * | 4/2012 | Sakurai | ............... | H04N 13/31 333/256 |
| 2013/0058329 A1 * | 3/2013 | Warke | ............... | H04L 12/50 370/359 |
| 2013/0070330 A1 * | 3/2013 | Ryf | ............... | G02B 6/2817 359/334 |
| 2013/0093640 A1 * | 4/2013 | Kwon | ............... | H01Q 1/52 343/841 |
| 2013/0107853 A1 * | 5/2013 | Pettus | ............... | H04W 84/10 370/330 |
| 2013/0141664 A1 * | 6/2013 | Toyoyama | ............... | G02F 1/133608 349/59 |
| 2013/0163483 A1 * | 6/2013 | Sarral | ............... | H01Q 9/0428 370/277 |
| 2014/0285277 A1 * | 9/2014 | Herbsommer | ............... | H01P 5/107 333/1 |
| 2015/0185425 A1 * | 7/2015 | Gundel | ............... | G02B 6/43 455/90.2 |
| 2015/0280827 A1 * | 10/2015 | Adiletta | ............... | H01P 5/00 398/116 |
| 2016/0365899 A1 * | 12/2016 | Pelissier | ............... | H04M 1/021 |
| 2017/0149112 A1 * | 5/2017 | Almgren | ............... | H01P 3/00 |
| 2018/0123242 A1 * | 5/2018 | Jeon | ............... | H01Q 1/521 |

FOREIGN PATENT DOCUMENTS

| | | |
|---|---|---|
| KR | 10-2000-0064367 | 11/2000 |
| KR | 10-0815154 | 3/2008 |
| KR | 10-2015-0108859 | 9/2015 |
| KR | 10-1661243 | 9/2016 |
| KR | 10-1709076 | 2/2017 |

OTHER PUBLICATIONS

Written Opinion of the ISA for PCT/KR2018/005309 dated Sep. 11, 2018, 5 pages.
Notice of Preliminary Rejection dated Jun. 28, 2021 in counterpart KR Application No. 10-2017-0098857 and partial English-language translation.

* cited by examiner

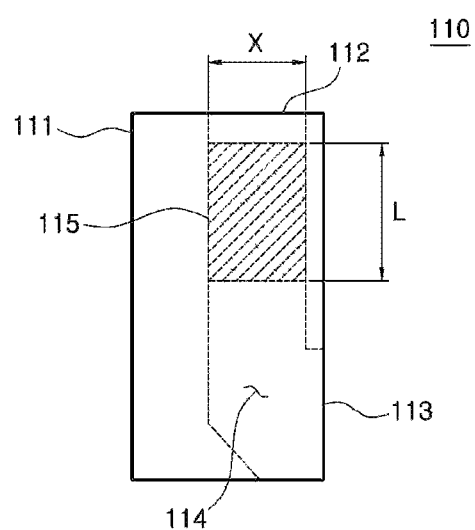

WAVEGUIDE CONNECTOR AND DISPLAY APPARATUS INCLUDING THE SAME

This application is the U.S. national phase of International Application No. PCT/KR2018/005309 filed May 9, 2018 which designated the U.S. and claims priority to KR Patent Application No. 10-2017-0098857 filed Aug. 4, 2017, the entire contents of each of which are hereby incorporated by reference.

BACKGROUND

1. Field

Embodiments of the disclosure relate to a waveguide connector for connecting a circuit board and a waveguide, and a display apparatus including the same.

2. Description of Related Art

A display apparatus is an output device that converts electrical information into visual information and displays the same to a user. The display apparatus may include not only a television and a monitor but also a portable device such as a notebook PC, a smartphone, and a tablet PC.

The display apparatus may include a self-luminous display panel such as an organic light-emitting diode (OLED) or a light receiving display panel such as a liquid crystal display (LCD).

The display apparatus to which the light receiving display panel is applied may include a backlight unit that provides light to the display panel. The backlight unit may include an edge type in which a light source is disposed on at least one side of the display panel, and a direct type disposed in the rear of the display panel.

The display apparatus may include various circuit boards for the operation of the display apparatus. A plurality of the circuit boards may be connected to each other to send and receive data, signals, or power. For example, the plurality of circuit boards may be connected to each other by an electric wire, a flexible flat cable (FFC), a flexible printed circuit board (FPCB), or a waveguide.

SUMMARY

One aspect provides a waveguide apparatus and a display apparatus including the same having a partition therein so that each of electromagnetic signals of different phases generated from a circuit board independently forms a waveform.

Technical Solution

In accordance with an aspect of the disclosure, a waveguide connector, comprises a main body including an inner space through which an electromagnetic signal travels; a first opening provided on one surface of the main body so that electromagnetic signals of different phases generated from an antenna provided on a circuit board enter the inner space; a second opening provided on the other surface of the main body so that the electromagnetic signals of the different phases traveling through the inner space enter a waveguide; and a partition wall provided in the inner space of the main body so that each of the electromagnetic signals having the different phases independently forms a waveform.

The partition wall may have a length determined in accordance with wavelengths of the electromagnetic signals of the different phases.

The partition wall may have a length of corresponding to half of the wavelengths of the electromagnetic signals of the different phases.

The partition wall may be disposed closer to the first opening than the second opening.

The first opening may be provided in a shape corresponding to a region in which the antenna is provided on the circuit board.

The partition wall may partition the inner space extending from the first opening in a shape corresponding to a region in which a plurality of sub-antennas for generating the electromagnetic signals of the different phases are provided among the antennas.

The partition wall may be formed of a same material as a surface material of an inner wall of the main body forming the inner space.

The main body may be formed of a same material as a surface material of an inner wall of the waveguide.

The second opening may be provided in a shape corresponding to an opening of the waveguide.

In accordance with an aspect of the disclosure, a display apparatus for displaying an image through a display panel, comprises a first circuit board and a second circuit board for an operation of the display apparatus; a waveguide configured to transmit electromagnetic signals of different phases generated in the first circuit board to the second circuit board; and a waveguide connector configured to connect the waveguide and the first circuit board and having partition wall formed in an inner space such that the electromagnetic signals of the different phases independently form waveforms.

The partition wall may have a length determined in accordance with a wavelength of the electromagnetic signals of the different phases.

The partition wall may have a length of corresponding to half of the wavelengths of the electromagnetic signals of the different phases.

The waveguide connector may comprise a first opening provided on one surface of a main body so that the electromagnetic signals of the different phases generated from an antenna provided on a circuit board enter the inner space; and a second opening provided on the other surface of the main body so that the electromagnetic signals of the different phases traveling through the inner space enter the waveguide.

The partition wall may be disposed closer to the first opening than the second opening.

The first opening may be provided in a shape corresponding to a region in which the antenna is provided on the first circuit board.

Advantageous Effects

According to the waveguide connector and the display apparatus including the same according to an aspect, since the electromagnetic signals of the different phases are independently formed after being combined with each other, a signal environment may be improved.

BRIEF DESCRIPTION OF THE DRAWINGS

FIG. 7B is a side view of the waveguide connector according to one embodiment.

DETAILED DESCRIPTION

Figure 1:
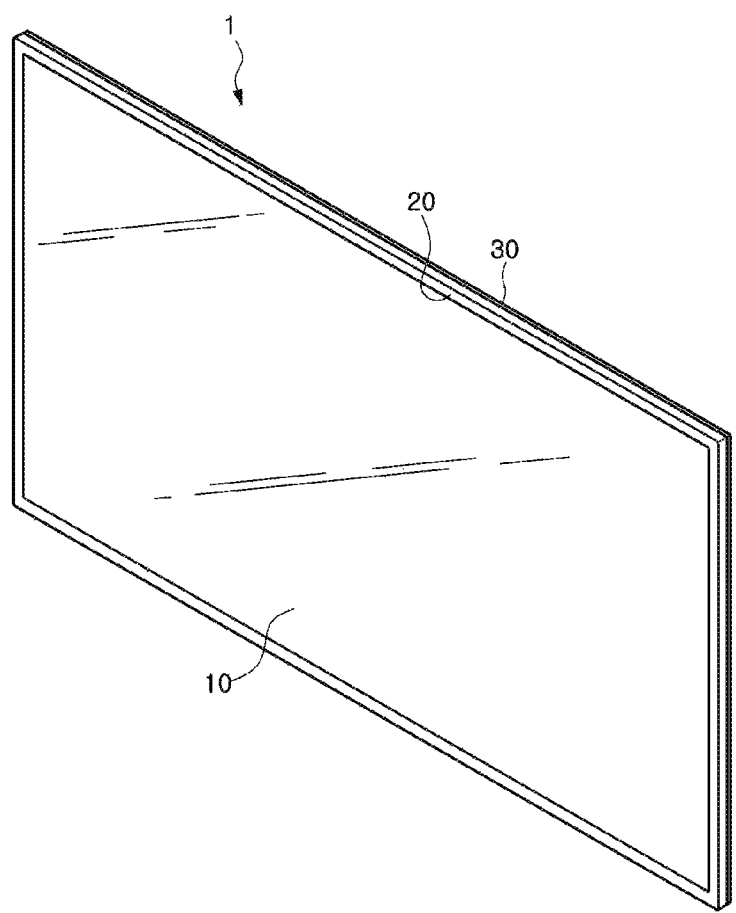
FIG. 1 is a perspective view of a display apparatus according to an embodiment of the present disclosure.

Reference will now be made in detail to the embodiments of the disclosure, examples of which are illustrated in the accompanying drawings, wherein like reference numerals refer to like elements throughout. This specification does not describe all elements of the embodiments of the disclosure and detailed descriptions on what are well known in the art or redundant descriptions on substantially the same configurations may be omitted. The terms 'unit, module, member, and block' used herein may be implemented using a software or hardware component. According to an embodiment, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

In this specification, the terms "first," "second," etc. are used to distinguish one component from other components and, therefore, the components are not limited by the terms.

An expression used in the singular form encompasses the expression of the plural form, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

Figure 2:
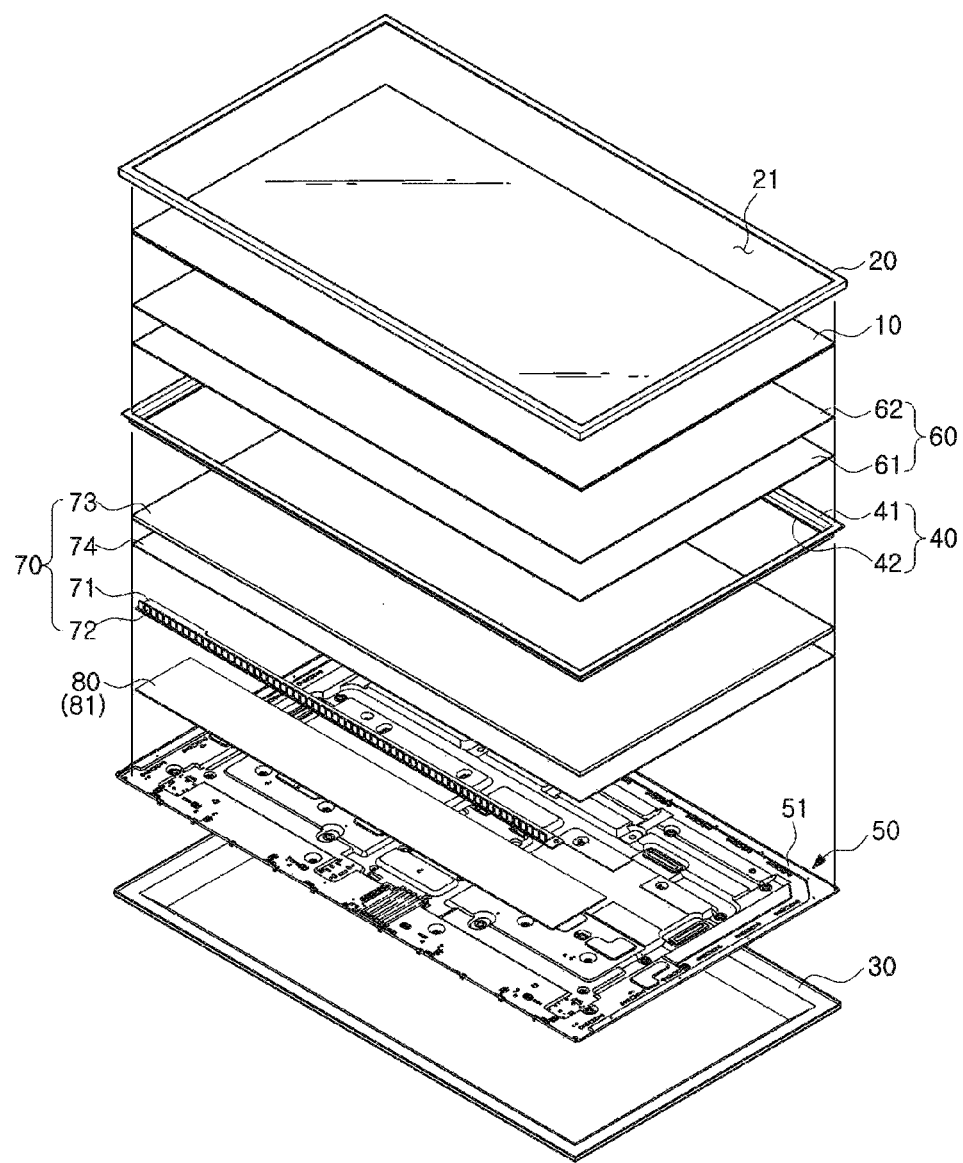
FIG. 2 is an exploded perspective view of a display apparatus according to an embodiment of the present disclosure.

FIG. 1 is a perspective view of a display apparatus according to an embodiment of the present disclosure, and FIG. 2 is an exploded perspective view of a display apparatus according to an embodiment of the present disclosure.

As shown in FIG. 1, a display apparatus 1 may be a flat display apparatus in which a display panel 10 displaying an image is flat. Although not shown in the drawings, the display apparatus may be a curved display apparatus in which the display panel is bent, or a bendable display apparatus in which the display panel may be transformed from flat to curved and curved to flat or the curvature of the curved surface may be changed.

Referring to FIGS. 1 and 2, the display panel 10 may include an LCD panel. The LCD panel may display an image using a liquid crystal that exhibits optical properties according to changes in voltage and temperature. The LCD panel may include a thin film transistor substrate (TFT), a color filter substrate coupled to face the thin film transistor substrate, and a liquid crystal injected between the thin film transistor substrate and the color filter substrate. The thin film transistor substrate may be a transparent substrate in which a thin film transistor, which is a switching element, is formed in a matrix form, and the color filter substrate may be a transparent substrate in which an RGB color pixel, which is a color pixel expressing a predetermined color, is formed by a thin film process.

The display apparatus 1 may include a backlight unit 70 that provides light to the display panel 10. The backlight unit 70 may be disposed under the display panel 10 to shine light toward the display panel 10.

The backlight unit 70 may be an edge type in which a light source 72 is disposed on at least one side of four sides of the display panel 10. Although not shown in the drawings, the display apparatus may include a direct-type backlight unit in which a light source is disposed directly below the display panel.

The backlight unit 70 may include the light source 72, a printed circuit board 71 on which the light source 72 is mounted, and various optical members disposed on a movement path of light emitted from the light source 72.

The light source 72 may include a light emitting diode (LED). The LED may be provided in a package in which an LED chip is mounted on a substrate and filled with a resin. Meanwhile, a cold cathode fluorescent lamp (CCFL) or an external electrode fluorescent lamp (EEFL) may be used as the light source.

A plurality of the light sources 72 may be mounted on the printed circuit board 71 in a line along the edge of the display panel 10. The printed circuit board 71 may be printed with a circuit pattern for transmitting a driving power and a signal to the light source 72. The printed circuit board 71 may be mounted on a bottom chassis 50.

The optical member may be disposed on a movement path of the light emitted from the light source 72 to guide the traveling direction of the light or to improve the optical characteristics. The optical member includes a light guide plate 73 for evenly dispersing light emitted from the light source 72 toward the display panel 10, and a reflective sheet 74 for reflecting light to prevent light loss.

The light guide plate 73 may be formed of a polymethyl methacrylate (PMMA) material. The light guide plate 73 may be provided with a pattern for changing a path of light. In the edge type backlight unit, the light source 72 may be located at the side of the light guide plate 73. Light incident on the side surface of the light guide plate 73 may be scattered in a pattern formed on the bottom surface of the light guide plate 73 and emitted through the top surface of the light guide plate 73.

The reflective sheet 74 may reflect light emitted from the light source 72 so that light is not lost at the bottom of the light guide plate 73. The reflective sheet 74 may be formed in various forms such as a sheet, a film, and a plate. For example, the reflective sheet 74 may be formed by coating a material having a high reflectance on a base material. As the base material, SUS, BRASS, Aluminum, PET, etc. may be used, and silver, TiO2, etc. may be used as a high reflection coating agent.

The reflective sheet 74 may be seated and supported on the printed circuit board 71. The light guide plate 73 may be seated on the reflective sheet 74. The light guide plate 73 may be disposed such that the side surface of the light guide plate 73 is spaced apart from the light source 72 by considering thermal expansion.

The optical member may further include a quantum dot unit (not shown) or a quantum dot sheet. The quantum dot unit or the quantum dot sheet may change the wavelength of light to improve color reproducibility. Color reproducibility is a measure of how close to a natural color it is and how large an area can be expressed in color coordinates. The quantum dot unit or the quantum dot sheet may be disposed on a path of light between the light source and the display panel.

The display apparatus may include various optical sheets 60 to improve optical characteristics. The optical sheet 60 may be disposed above the light guide plate 73 to improve the optical characteristics of the light emitted from the light guide plate 73.

The optical sheet 60 may include a diffusion sheet 61 and a prism sheet 62. Since the light guided through the light guide plate 73 directly enters an eye, the pattern of the light guide plate 73 is reflected in the eye as it is. Therefore, the diffusion sheet 61 may cancel or minimize the pattern of the light guide plate 73.

The prism sheet 62 may improve the light brightness by refocusing the light whose brightness has fallen while passing through the diffusion sheet 61. The prism sheet 62 may be a DBEF sheet, which is a high-brightness prism sheet, or the like.

The optical sheet may further include a protection sheet for protecting the optical sheet from external impact or foreign matter inflow. The optical sheet 60 may be disposed between the light guide plate 73 and the display panel 10.

The display apparatus 1 may include a chassis assembly for receiving and supporting the display panel 10 and the backlight unit. The chassis assembly may include a top chassis 20, a middle mold 40, and the bottom chassis 50.

The top chassis 20 may include an opening 21 for exposing the display panel 10. The middle mold 40 may include a middle mold side 41 and an intermediate support 42 that protrudes inward from the middle mold side 41 to support and maintain the gap between the display panel 10 and the optical member.

The bottom chassis 50 may support the backlight unit 70. Various components of the display apparatus 1 such as the top chassis 20 and the middle mold 40 may be fixedly supported on the bottom chassis 50.

The printed circuit board 71 of the backlight unit 70 may be mounted on a top surface 51 of the bottom chassis 50. The bottom chassis 50 may serve to radiate heat generated from the light source 72 to the outside. Heat generated from the light source 72 may be transferred to the bottom chassis 50 through the printed circuit board 71, and may radiate heat from the bottom chassis 50.

The display apparatus 1 may include a heat sink 80 that serves to absorb and release heat generated from the backlight unit 70 to the outside. The heat sink 80 may be disposed between the printed circuit board 71 and the bottom chassis 50. The heat sink 80 may be bonded to the bottom chassis 50. The heat sink 80 may include various metal materials such as aluminum and stainless steel having good thermal conductivity, or plastic materials such as ABS (Acrylonitrile-Butadiene-Styrene) resin.

The bottom chassis 50 may also be formed of various metal materials such as aluminum and stainless steel having good thermal conductivity, or plastic materials such as ABS resin. The printed circuit board 71 may also use a metal PCB made of aluminum having good thermal conductivity.

At least one of the top chassis 20, the middle mold 40, and the bottom chassis 50 may be omitted or integrally formed with each other. The display apparatus 1 may include a rear cover 30 surrounding the chassis assembly to protect and receive the chassis assembly. Although not shown in the drawings, the display apparatus 1 may further include a leg (not shown) for supporting the display apparatus 1 on an installation surface.

The display apparatus 1 may include various circuit boards. The various circuit boards may include a main board, a switched mode power supply (SMPS) board, a source board, and the like.

The main board may include a processor for driving the display apparatus 1 and a power management device. The SMPS board may supply power for driving the display apparatus 1. The source board may control the display panel 10.

The main board, the SMPS board, the source board, etc. may be arranged independently or mutually merged. The circuit boards arranged independently of each other may be connected to each other to transmit and receive data, signals, or power.

The circuit boards disposed independently of each other may include an integrated circuit (IC) for transmitting and receiving data, signals, or power wirelessly. The display apparatus 1 may include a waveguide 100 to wirelessly exchange data, signals, or power between the circuit boards.

The waveguide 100 may be provided in a separate and independent configuration, or may be formed by combining a plurality of configurations of the display apparatus 1. Hereinafter, the case where the waveguide 100 is formed by coupling the bottom chassis 50 and the heat sink 80 or a separate member 81 will be described.

Figure 3:
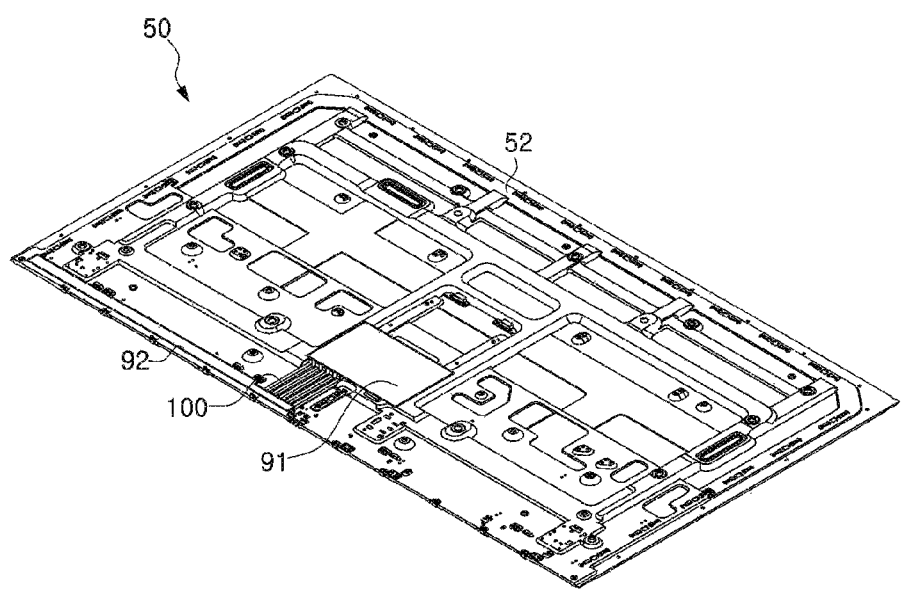
FIG. 3 illustrates a bottom surface of a bottom chassis of a display apparatus according to an embodiment of the present disclosure.
Figure 4:
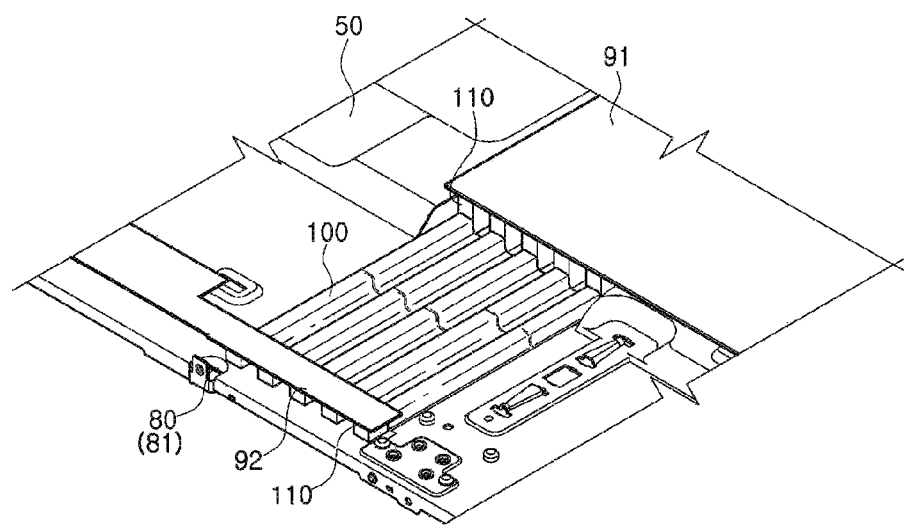
FIG. 4 is an enlarged view of a portion of the bottom chassis illustrated in FIG. 3.
Figure 5:
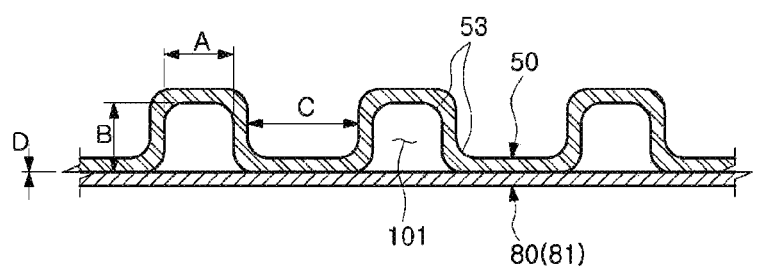
FIG. 5 is a view showing a part of a cross section of a waveguide shown in FIG. 4.

FIG. 3 illustrates a bottom surface of a bottom chassis of a display apparatus according to an embodiment of the present disclosure, FIG. 4 is an enlarged view of a portion of the bottom chassis illustrated in FIG. 3, and FIG. 5 is a view showing a part of a cross section of a waveguide shown in FIG. 4.

Referring to FIGS. 3 and 4, among the various circuit boards, a first circuit board 92 and a second circuit board 91 may be disposed on the bottom surface 52 of the bottom chassis 50. The first circuit board 92 and the second circuit board 91 may include an IC (not shown) capable of transmitting and receiving data, signals, or power by wireless communication.

The bottom chassis 50 may include the waveguide 100 for wireless communication between the first circuit board 92 and the second circuit board 91. The waveguide 100 may be disposed between the first circuit board 92 and the second circuit board 91.

Referring to FIG. 5, the waveguide 100 may be a duct shape having four sides. The waveguide 100 may be made of a material that can transmit the surface of the inner wall without leaking electromagnetic signals. For example, the surface of the inner wall of the waveguide 100 may be made of metal such as aluminum, iron, or copper.

A height B and a width A of the waveguide 100 are determined by the wavelength of the electromagnetic signal passing through the waveguide, and may be determined by further considering transmittance or permittivity. The waveguide 100 may have the height B and the width A equal to the wavelength or half of the wavelength of the transmitted electromagnetic signal. For example, when the first circuit board 92 transmits an electromagnetic signal of 60 GHz to the second circuit board 91, the width A and the height B of the waveguide 100 may be 5 mm or 2.5 mm.

The waveguide 100 may be formed by combining the bottom chassis 50 and the heat sink 80. The bottom chassis 50 may include three of four sides of the waveguide 100, and the heat sink 80 may include the other of the four sides of the waveguide 100. The bottom chassis 50 may be pressed, injected, or cut to form three sides of the waveguide 100.

One surface of the waveguide 100 according to an embodiment may be formed by coupling the heat sink 80 formed of a flat plate to the bottom chassis 50. The bottom chassis 50 and the heat sink 80 may be joined such that a distance D is 0.1 mm or less so that the electromagnetic signals do not leak from the waveguide 100.

In addition, in the waveguide 100 according to another embodiment, two of four surfaces may be formed by the bottom chassis 50, and the other two surfaces may be formed by the heat sink 80. In addition, in the waveguide 100 according to another embodiment, one of four surfaces may be formed by the bottom chassis 50, and the other three surfaces may be formed by the heat sink 80.

The display apparatus 1 may include the separate member 81 forming the waveguide 100 by coupling with the bottom chassis 50 in addition to the heat sink 80. The heat sink 80 shown in the drawing may be replaced by the separate member 81 for forming the waveguide 100. The heat sink 80 or the separate member 81 may include a metallic material so that the electromagnetic signals do not pass through.

The first circuit board 92 and the second circuit board 91 may require a plurality of channels for wireless communication. The display apparatus 1 may include a plurality of the waveguides 100 for wireless communication between the first circuit board 92 and the second circuit board 91. In this case, interference of the electromagnetic signal may occur due to crosstalk between two different waveguide channels among a plurality of the waveguides. In an embodiment of the present invention, if the crosstalk between channels is −25 dB, a desired performance is realized. In one embodiment, considering that a waveguide having the width A of 5 mm and the height B of 2.5 mm that transmits an electromagnetic signal of 60 GHz is formed, two different waveguides are spaced at least 7 mm (C) so as not to interfere with each other.

The waveguide 100 may include a round at an edge by processing the bottom chassis 50. According to the bending direction of the bottom chassis 50, the center of curvature of a round 53 may be located inside or outside the waveguide 100. In the embodiment in which the waveguide having the width A of 5 mm and the height B of 2.5 mm is formed, the radius of curvature of the round 53 may be 1.5 mm or more.

The waveguide 100 may be connected to the IC of the first circuit board 92 and the IC of the second circuit board 91 by a waveguide connector 110. Hereinafter, the structure of the waveguide connector 110 and a method of transmitting the electromagnetic signal through the same will be described in detail with reference to FIGS. 6, 7A, and 7B.

Figure 6:
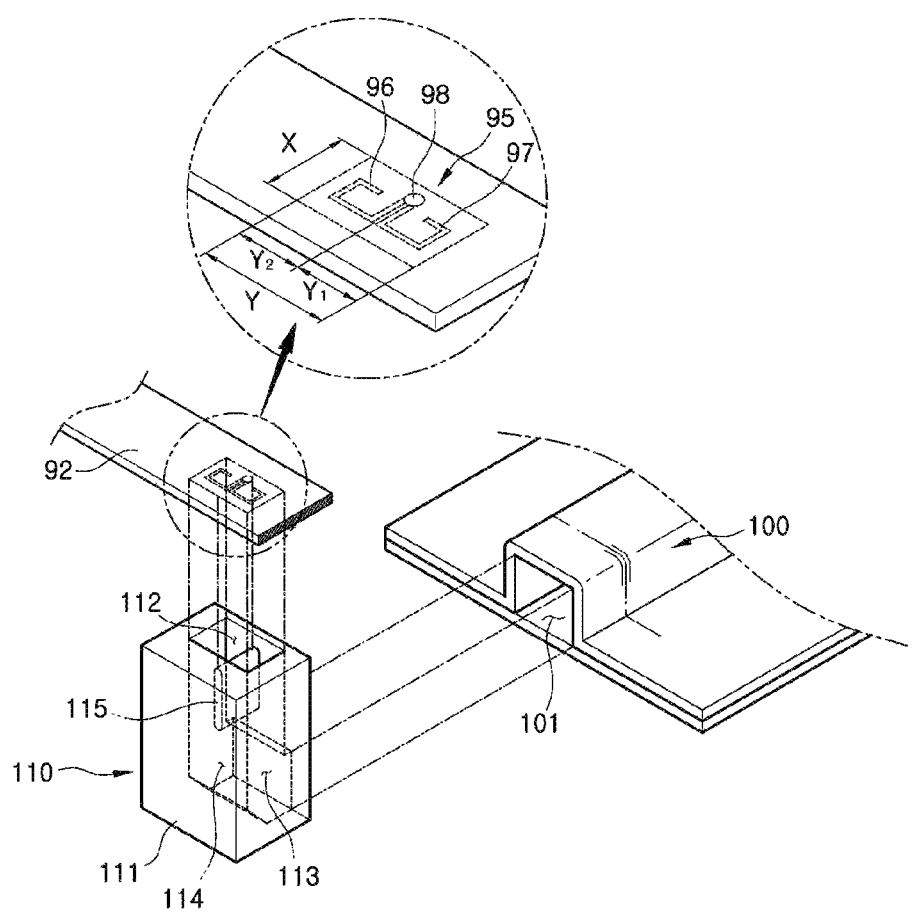
FIG. 6 is a view for explaining a method of connecting a waveguide connector with a waveguide and a circuit board according to an embodiment of the present disclosure.
Figure 7A:
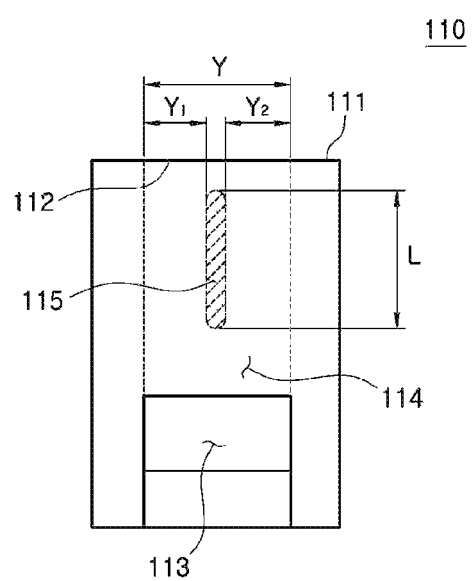
FIG. 7A is a front view of a waveguide connector according to one embodiment of the present disclosure.

FIG. 6 is a view for explaining a method of connecting a waveguide connector with a waveguide and a circuit board according to an embodiment of the present disclosure, FIG. 7A is a front view of a waveguide connector according to one embodiment of the present disclosure, and FIG. 7B is a side view of the waveguide connector according to one embodiment.

In FIG. 6, for convenience of description, the waveguide connector 110 is connected to the first circuit board 92 and the waveguide 100 on a path through which the electromagnetic signal is transmitted from the first circuit board 92 to the second circuit board through the waveguide 100, but the disclosed invention is not limited thereto. Accordingly, the waveguide connector 110 may connect the second circuit board and the waveguide 100 on a path through which the electromagnetic signal is transmitted from the second circuit board to the first circuit board 92 through the waveguide 100.

The first circuit board 92 may include an antenna 95 composed of a plurality of the sub-antennas 95 to generate electromagnetic signals of different phases. In the case of FIG. 6, the first circuit board 92 may include the dipole antenna 95 that generates two electromagnetic signals having a phase difference of 180 Hz.

Specifically, the dipole antenna 95 includes a first sub-antenna 96 for generating an electromagnetic signal of a reference phase; a second sub-antenna 97 for generating an electromagnetic signal having a phase difference of 180 Hz from the reference phase; and a power supplier 98 for supplying power to the first sub-antenna 96 and the second sub-antenna 97.

When power is supplied from the power supplier 98, the first sub-antenna 96 and the second sub-antenna 97 may generate the same signal having a phase difference of 180 degrees. Compared to a monopole antenna that generates one electromagnetic signal having a single phase, the dipole antenna 95 generates a plurality of identical signals having different phases, and thus may have higher efficiency in terms of signal strength.

The dipole antenna 95 may be provided in a pattern form on a specific region on the first circuit board 92. At this time, the wavelength of the electromagnetic signal generated from the dipole antenna 95 may be determined by the length in one direction of the dipole antenna 95 pattern.

Therefore, the waveguide connector 110 is provided to correspond to the pattern area of the dipole antenna 95 provided on the first circuit board 92 so that there is no loss and distortion of the electromagnetic signal generated by the dipole antenna 95.

Specifically, the waveguide connector 110 includes a main body 111; a first opening 112; and a second opening 113.

The main body 111 may include an inner space 114 through which an electromagnetic signal travels. In order to prevent the electromagnetic signal transmitted through the waveguide connector 110 from being lost to the outside, the surface of the inner wall of the main body 111 forming the inner space 114 may be made of the same material as the surface of the inner wall of the waveguide 100. For example, the surface of the inner wall of the waveguide connector 110 may be made of metal such as aluminum, iron, or copper.

The first opening 112 is provided on one surface of the main body 111 so that the electromagnetic signals of the different phases generated from the antenna 95 provided in the first circuit board 92 enter the inner space 114 of the main body 111. One surface of the main body 111 provided with the first opening 112 is connected to the first circuit board 92 in contact with each other, and the electromagnetic signal generated from the antenna 95 of the first circuit board 92 may enter the inner space 114 of the main body 111 of the waveguide connector 110.

The first opening 112 may be formed in a shape corresponding to a region in which the antenna 95 is provided in the first circuit board 92. In detail, the first opening 112 may be provided to have an area greater than or equal to the pattern area of the antenna 95 of the first circuit board 92.

Referring to FIGS. 7A 7B, the first opening 112 may be provided in the shape of a rectangle having a height X and a width Y. At this time, the height X and the width Y may be determined so that the antenna 95 pattern region on the first circuit board 92 may fall within the shape of the first opening 112.

As a result, the electromagnetic signals generated in the pattern of the antenna 95 of the first circuit board 92 may enter the inner space 114 of the main body 111 of the waveguide connector 110 through the first opening 112 without leakage and loss.

The second opening 113 may be provided on the other surface of the main body 111 so that the electromagnetic signals of the different phases traveling through the inner space 114 enter the waveguide 100. In FIG. 6, the second opening 113 may be provided on any one of a plurality of surfaces perpendicular to one surface of the main body 111 in which the first opening 112 is provided.

The second opening 113 may be provided in a shape corresponding to an opening 101 of the waveguide 100. In detail, the second opening 113 may have an area less than or equal to the area of the opening 101 of the waveguide 100. As a result, the electromagnetic signals of the different phases traveling through the inner space 114 of the main body 111 may enter the waveguide 100 through the second opening 113 without leakage and loss.

On the other hand, since the antenna 95 on the first circuit board 92 generates a plurality of the electromagnetic signals of the different phases, the plurality of electromagnetics of the different phases enter the waveguide connector 110 through the first opening 112. The signal may be unstably coupled within the inner space 114 of the waveguide connector 110. Specifically, since a plurality of the signals are unstably coupled before a waveform of each of the plurality of electromagnetic signals having the different phases is formed, an insertion loss and a reflection loss due to the reflected wave may occur. As a result, the signal transmission efficiency to the waveguide 100 in the waveguide connector 110 may be lowered.

In order to solve this problem, the waveguide connector 110 according to the disclosed embodiment may be provided so that each of the electromagnetic signals of the different phases independently form a waveform and then become combined. Specifically, the waveguide connector 110 according to the disclosed embodiment may further include a partition wall 115 provided in the inner space 114 of the main body 111 so that each of the electromagnetic signals of the different phases independently form a waveform.

Referring to FIG. 6, the partition wall 115 may be provided perpendicular to the pattern of the antenna 95 of the first opening 112 and the first circuit board 92 connected thereto. In addition, the partition wall 115 may be provided to be adjacent to the first opening 112 than the second opening 113. As a result, the inner space 114 extending from the first opening 112 to the inside of the main body 111 may be partitioned into a plurality of spaces by the partition wall 115. Each of the plurality of partitioned spaces may be a traveling path of each of a plurality of the electromagnetic signals having the different phases. When the dipole antenna 95 is provided on the first circuit board 92 as shown in FIG. 6, the partition wall 115 may partition the inner space 114 into two spaces for traveling two electromagnetic signals.

The partition wall 115 constitutes the antenna 95 of the first circuit board 92 so that each of the plurality of electromagnetic signals of the different phases generated by the antenna 95 can travel through each of the plurality of partitioned spaces. The inner space 114 extending from the first opening 112 may be partitioned in a shape corresponding to an area in which each of the plurality of sub-antennas 95 is provided.

Referring to FIG. 7A, the partition wall 115 may partition the width Y of the inner space 114 extending from the first opening 112 into Y1 and Y2. At this time, each region of the sub-antenna 95 pattern on the first circuit board 92 may belong to each space partitioned by the partition wall 115 of the inner space 114 extending from the first opening 112, thus the widths Y1 and Y2 can be determined.

As a result, among the antenna 95 patterns of the first circuit board 92, the electromagnetic signals of the different phases generated in each of the sub-antenna 95 patterns may enter each of the inner spaces 114 partitioned by the partition wall 115 without leakage and loss.

In addition, the partition wall 115 may have a length determined according to the wavelength of the electromagnetic signal so that each electromagnetic signal entering the partitioned inner space 114 independently forms a waveform. FIGS. 7A and 7B illustrate a case in which the partition wall 115 has a length L.

The length L of the partition wall 115 according to an embodiment may be provided to have a length at least half of the wavelength of the electromagnetic signal having the different phase. Through this, each electromagnetic signal entering the inner space 114 of the waveguide connector 110 partitioned by the partition wall 115 may form a waveform having a half-wavelength or more.

Each of the electromagnetic signals of the different phases having a half-wavelength or more waveform can be stably coupled in the inner space 114 of the waveguide connector 110 where the extension of the partition wall 115 ends, resulting in insertion loss and reflection due to the reflected wave being minimized.

Up to now, the waveguide connector 110 in which the second opening 113 is provided on any one of a plurality of surfaces perpendicular to one surface of the main body 111 in which the first opening 112 is provided has been described. Hereinafter, a waveguide connector 110a in which a second opening 113a is provided at another position will be described.

Figure 8:
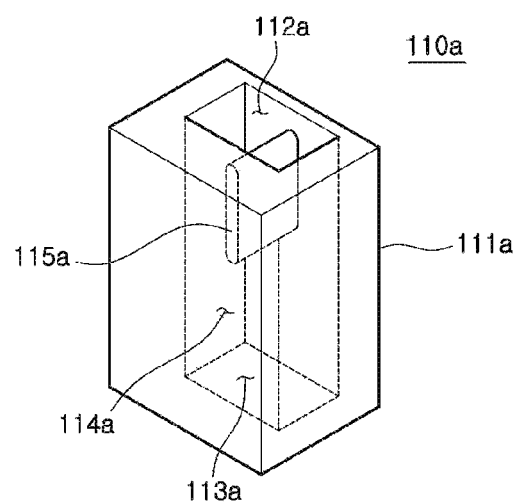
FIG. 8 is a perspective view of a waveguide connector according to another embodiment of the present disclosure.

FIG. 8 is a perspective view of a waveguide connector according to another embodiment of the present disclosure.

The waveguide connector 110a according to another embodiment may include a main body 111a including an inner space 114a; a first opening 112a; the second opening 113a; and a partition wall 115a. Since the waveguide connector 110a of FIG. 8 differs only in the positions of the waveguide connector 110 and the second openings 113 and 113a of FIG. 6, redundant description is omitted.

Unlike FIG. 6, in the waveguide connector 110a of FIG. 8, the second opening 113a may be provided on a surface of the waveguide connector 110a opposite to one surface of the main body 111a in which the first opening 112a is provided. In the waveguide connector 110a, the inner space 114a may be partitioned by the partition wall 115a, and the electromagnetic signals having the different phases may enter each of the partitioned inner spaces 114a to form a waveform. As a result, like the waveguide connector 110 of FIG. 6, the waveguide connector 110a of FIG. 8 may also minimize insertion loss and reflection loss due to the reflected wave.

Up to now, the waveguide connector 110 in which the partition wall 115 divides the inner space 114 into two when the antenna 95 is implemented as a dipole antenna has been described. However, when the antenna 95 includes three or more sub-antennas to generate electromagnetic signals of three or more different phases, the partition wall of the waveguide connector 110 partitions the inner space 114 into a number corresponding to the electromagnetic signals. For example, if the antenna 95 of the first circuit board 92 generates four electromagnetic signals that have different phases to each other, the partition wall 115 of the waveguide connector 110 partitions the interior space into four spaces.

Figure 9A:
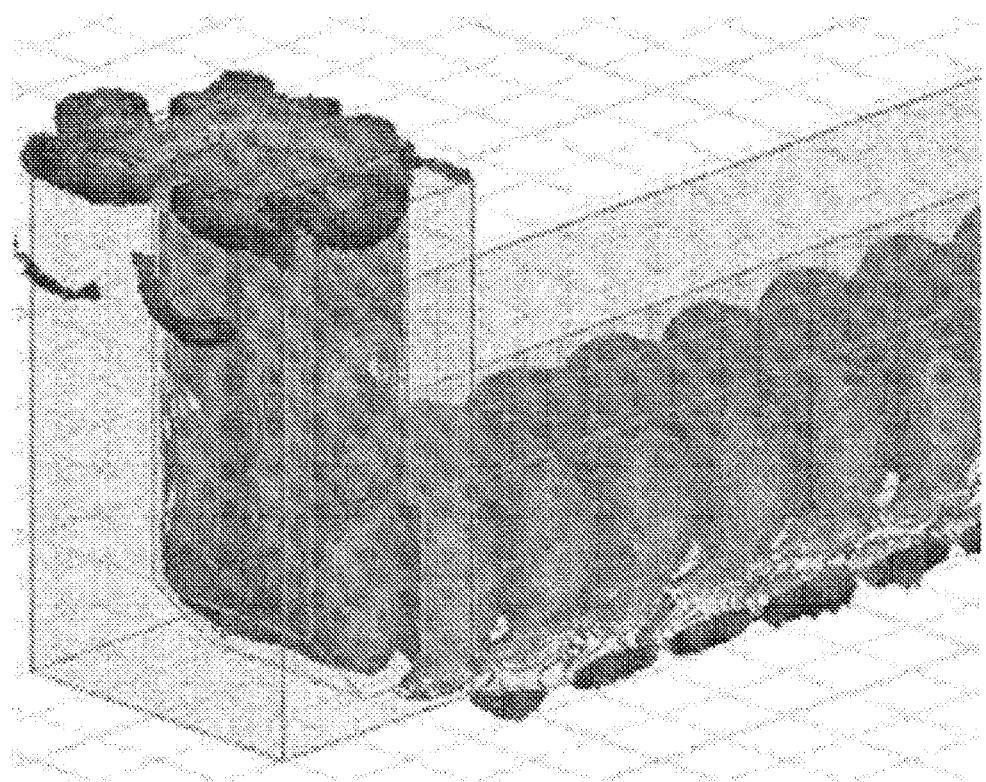
FIG. 9A illustrates an E-field formed by an electromagnetic signal traveling through a conventional barrier-free waveguide connector.
Figure 9B:
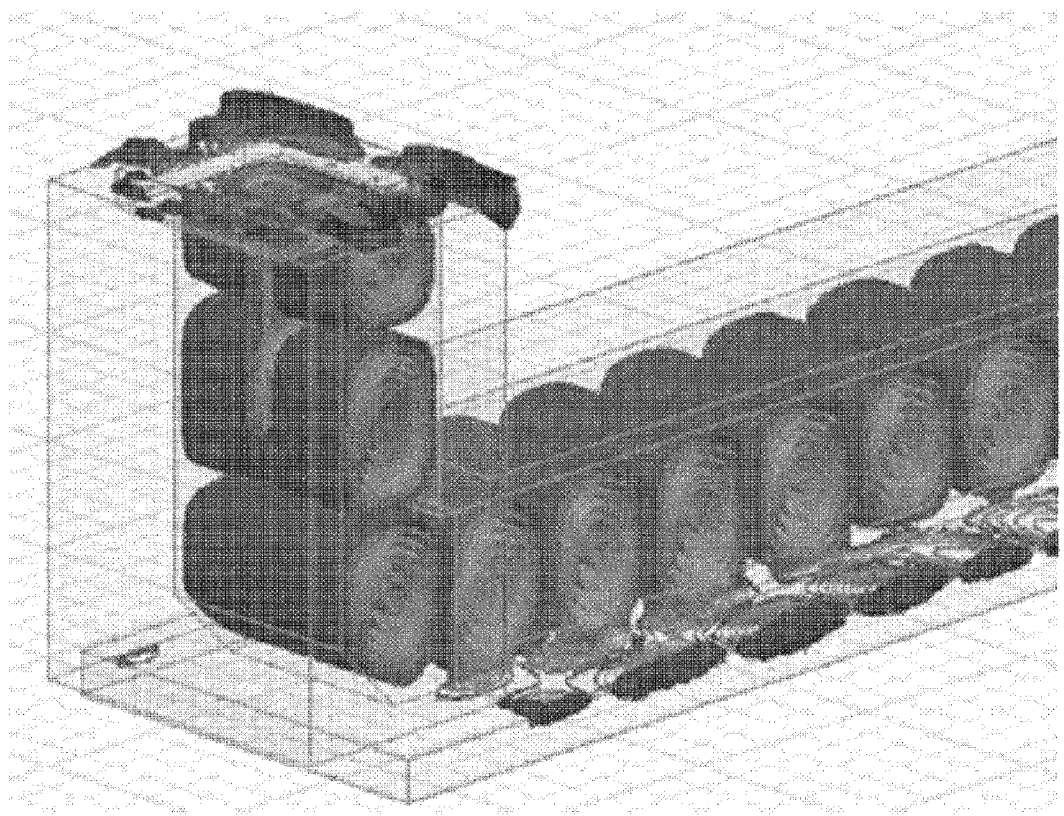
FIG. 9B illustrates an E-field formed by an electromagnetic signal traveling through a waveguide connector according to an exemplary embodiment of the present disclosure.
Figure 10A:
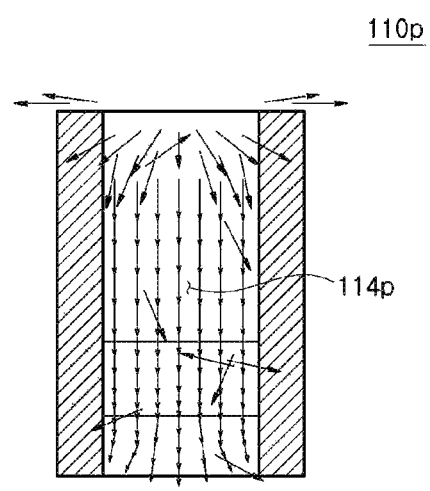
FIG. 10A illustrates a pointing vector of an electromagnetic signal traveling through a conventional barrier-free waveguide connector.
Figure 10B:
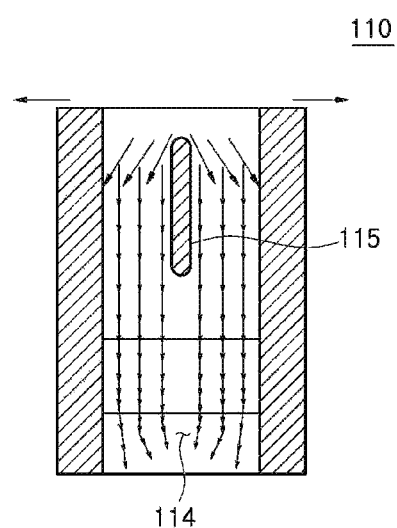
FIG. 10B illustrates a pointing vector of an electromagnetic signal traveling through a waveguide connector according to one embodiment of the present disclosure.

FIG. 9A illustrates an E-field formed by an electromagnetic signal traveling through a conventional barrier-free waveguide connector, and FIG. 9B illustrates an E-field formed by an electromagnetic signal traveling through a waveguide connector according to an exemplary embodiment of the present disclosure, FIG. 10A illustrates a pointing vector of an electromagnetic signal traveling through a conventional barrier-free waveguide connector, and FIG. 10B illustrates a pointing vector of an electromagnetic signal traveling through a waveguide connector according to one embodiment of the present disclosure.

In the case of FIG. 9A, it can be seen that E-fields formed by the electromagnetic signals of the different phases are unstable in an inner space 114p of a waveguide connector 110p. As a result, referring to FIG. 10A, it can be seen that a large signal loss is generated from the waveguide connector 110p.

On the other hand, since the inner space 114 is partitioned by the partition wall 115 in the waveguide connector 110 according to the embodiment of the present invention, waveforms of the electromagnetic signals of the different phases transmitted through the first opening 112 may be formed and then stably combined. Referring to FIG. 9B, even if the electromagnetic signals of the different phases having waveforms independently formed by the partition wall 115 are combined into one signal from the extension end point of the partition wall, a stable waveform can be formed. As a result, referring to FIG. 10B, when the electromagnetic signal transmitted through the waveguide connector 110 including the partition wall 115 is not compared with the case where the partition wall 115 is absent, the loss of the signal may be reduced.

What is claimed is:

1. A waveguide connector, comprising:
   a main body including an inner space through which an electromagnetic signal travels;
   a first opening provided on one surface of the main body so that electromagnetic signals of different phases generated from an antenna provided on a circuit board enter the inner space;
   a second opening provided on the other surface of the main body so that the electromagnetic signals of the different phases traveling through the inner space enter a waveguide; and
   a partition wall provided in the inner space of the main body so that each of the electromagnetic signals having the different phases independently forms a waveform,
   wherein the partition wall partitions the inner space extending from the first opening in a shape corresponding to a region in which a plurality of sub-antennas for generating the electromagnetic signals of the different phases are provided.

2. The waveguide connector of claim 1, wherein the partition wall has a length determined in accordance with wavelengths of the electromagnetic signals of the different phases.

3. The waveguide connector of claim 2, wherein the partition wall has a length of corresponding to half of the wavelengths of the electromagnetic signals of the different phases.

4. The waveguide connector of claim 1, wherein the partition wall is disposed closer to the first opening than the second opening.

5. The waveguide connector of claim 1, wherein the first opening provided in a shape corresponding to a region in which the antenna is provided on the circuit board.

6. The waveguide connector of claim 1, wherein the partition wall is formed of a same material as a surface material of an inner wall of the main body forming the inner space.

7. The waveguide connector of claim 6, wherein the main body is formed of a same material as a surface material of an inner wall of the waveguide.

8. The waveguide connector of claim 1, wherein the second opening is provided in a shape corresponding to an opening of the waveguide.

9. A display apparatus for displaying an image through a display panel, comprising:
   a first circuit board and a second circuit board for an operation of the display apparatus;
   a waveguide configured to transmit electromagnetic signals of different phases generated in the first circuit board to the second circuit board; and
   a waveguide connector configured to connect the waveguide and the first circuit board and having a partition wall formed in an inner space such that the electromagnetic signals of the different phases independently form waveforms.

10. The display apparatus of claim 9, wherein the partition wall has a length determined in accordance with a wavelength of the electromagnetic signals of the different phases.

11. The display apparatus of claim 10, wherein the partition wall has a length of corresponding to half of the wavelengths of the electromagnetic signals of the different phases.

12. The display apparatus of claim 9, wherein the waveguide connector comprises:
   a first opening provided on one surface of a main body so that the electromagnetic signals of the different phases generated from an antenna provided on a circuit board enter the inner space; and
   a second opening provided on the other surface of the main body so that the electromagnetic signals of the different phases traveling through the inner space enter the waveguide.

13. The display apparatus of claim 12, wherein the partition wall is disposed closer to the first opening than the second opening.

14. The display apparatus of claim 12, wherein the first opening is provided in a shape corresponding to a region in which the antenna is provided on the first circuit board.

\* \* \* \* \*